US 9,952,916 B2

(12) United States Patent
De Smet

(10) Patent No.: US 9,952,916 B2
(45) Date of Patent: Apr. 24, 2018

(54) EVENT PROCESSING SYSTEM PAGING

(71) Applicant: Microsoft Technology Licensing, LLC, Redmond, WA (US)

(72) Inventor: Bart De Smet, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/684,094

(22) Filed: Apr. 10, 2015

(65) Prior Publication Data

US 2016/0299799 A1    Oct. 13, 2016

(51) Int. Cl.
G06F 9/54        (2006.01)
G06F 17/30       (2006.01)
G06F 9/445       (2018.01)
G06F 9/45        (2006.01)

(52) U.S. Cl.
CPC ............ G06F 9/542 (2013.01); G06F 8/4443 (2013.01); G06F 9/445 (2013.01); G06F 17/30448 (2013.01); G06F 17/30516 (2013.01)

(58) Field of Classification Search
None
See application file for complete search history.

(56) References Cited

U.S. PATENT DOCUMENTS

| 7,403,959 | B2 | 7/2008 | Nishizawa et al. |
| 7,457,728 | B2 | 11/2008 | Chen et al. |
| 7,979,431 | B2 | 7/2011 | Qazi et al. |
| 8,099,410 | B2 | 1/2012 | Day et al. |
| 8,117,600 | B1* | 2/2012 | Roeck ................. G06F 11/3632 714/38.1 |
| 8,356,026 | B2 | 1/2013 | Heimendinger |
| 8,413,169 | B2 | 4/2013 | Grabs et al. |
| 8,788,484 | B2 | 7/2014 | Cammert et al. |
| 9,720,974 | B1* | 8/2017 | Sarmento .......... G06F 17/30525 |
| 2003/0151621 | A1* | 8/2003 | McEvilly ........... H04N 7/17318 715/744 |
| 2004/0172599 | A1* | 9/2004 | Calahan ................ G06F 17/272 715/234 |
| 2004/0230494 | A1* | 11/2004 | Lotvin ................... G06Q 20/02 705/26.4 |

(Continued)

FOREIGN PATENT DOCUMENTS

WO    2004077217 A2    9/2004

OTHER PUBLICATIONS

Weidlich, et al., "Optimising Complex Event Queries over Business Processes using Behavioural Profiles", In Proceeding of International Workshops and Education Track, Sep. 13, 2010, 12 pages.

(Continued)

*Primary Examiner* — Tuan Dao
(74) *Attorney, Agent, or Firm* — David W. Grillo, LLC

(57) ABSTRACT

A pageable query can be generated based on an event-processing query. The pageable query is a form of the event-processing query that supports swapping the event-processing query into and out of memory. For instance, page-in and page-out triggers can be inserted. After detection of a page-in trigger, the event-processing query can be loaded into the memory, and after detection of a page-out trigger, the event-processing query can be unloaded from memory.

20 Claims, 9 Drawing Sheets

(56) References Cited

U.S. PATENT DOCUMENTS

| | | | |
|---|---|---|---|
| 2005/0022115 A1* | 1/2005 | Baumgartner | G06F 17/30911 715/205 |
| 2007/0067305 A1* | 3/2007 | Ives | G06F 17/30864 |
| 2009/0049022 A1* | 2/2009 | Bender | G06F 17/30595 |
| 2010/0095075 A1* | 4/2010 | Ganesh | G06F 12/1072 711/161 |
| 2011/0246223 A1 | 10/2011 | Rundensteiner et al. | |
| 2012/0072411 A1 | 3/2012 | De Smet et al. | |
| 2012/0072442 A1* | 3/2012 | De Smet | G06F 17/30489 707/769 |
| 2013/0031567 A1 | 1/2013 | Nano et al. | |
| 2013/0160024 A1 | 6/2013 | Shtilman et al. | |
| 2013/0198435 A1* | 8/2013 | Sandadi | G06F 12/126 711/103 |
| 2014/0101132 A1* | 4/2014 | Konik | G06F 17/30442 707/718 |
| 2014/0237487 A1 | 8/2014 | Prasanna et al. | |

OTHER PUBLICATIONS

Li, et al. "Real-time Storm Detection and Weather Forecast Activation through Data", In Proceedings of Earth Science Informatics, vol. 1, Issue 2, Sep. 2008, 13 pages.

"Paging", Retrieved from <<https://en.wikipedia.org/w/index.php?title=Paging&oldid=648427227>>, Feb. 23, 2015 11 Pages.

Andrade, et al., "Active Semantic Caching to Optimize Multidimensional Data Analysis in Parallel and Distributed Environments", In Journal—Parallel Computing, vol. 33, Issue 7-8, Aug. 2007, pp. 497-520.

"International Search Report and Written Opinion Issued in PCT Application No. PCT/US2016/026579", dated Jun. 22, 2016, 12 Pages.

"International Preliminary Report on Patentability Issued in PCT Application No. PCT/US2016/026579", dated Apr. 6, 2017, 7 Pages.

* cited by examiner

EVENT PROCESSING SYSTEM PAGING

BACKGROUND

Event-processing systems continuously process events in real time as they are received. Events are data items that include a payload of data and an associated time. Event processing operates with respect to asynchronous event sequences or event streams, which are sequences of events that happen over time. Examples of event sequences include stock ticks identifying changes in price of a stock and social media messages. Processing is specified over an event sequence with a query to enable projection, filtering, and aggregation, for instance. Unlike traditional database queries, event-processing queries are not evaluated once over stored data. Rather, event-processing queries are evaluated continuously over events as the events occur. To enable substantially real time processing, event-processing systems store queries in memory and evaluate the queries as events arrive in the system.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to event-processing system paging. A pageable form of an event-processing query is generated that supports swapping of an event-processing query in and out of memory. For instance, the event-processing query can be rewritten to include page-in and page-out triggers as well as functionality to support deferred loading and preservation of a query on a page out. In operation, the event-processing query is loaded into memory after observing a page-in trigger and unloaded from memory to a persistent store after observing the page-out trigger.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
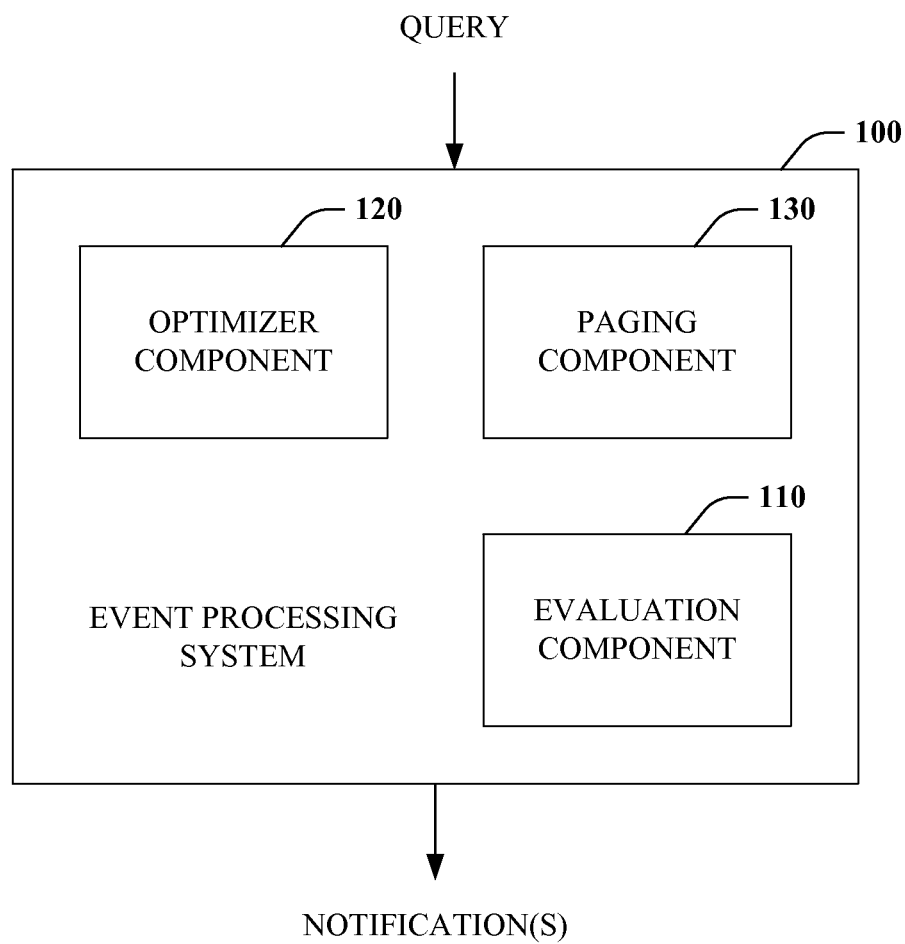
FIG. 1 is a block diagram of an event-processing system.

An event-processing system can involve hosting and servicing large numbers of subscriptions or longstanding event queries. For example, many queries can exist for a single user such as those associated with daily commute traffic notifications, weather updates, news about favorite topics, sports score updates, and airline flight notifications, among other things. Further, in the context of a large-scale event-processing system or service, this can correspond to millions, or a larger order of magnitude, of queries for processing. Event processing can also involve a large number of events in addition to a large number of subscriptions.

To achieve processing in near real time involves storing as much code associated with event-processing queries in memory as possible. As a result, when an event occurs, delay is not incurred to load code into memory to process the event. However, event-processing systems may have small and not-so-small standing queries that occupy non-trivial amounts of memory when kept resident in memory. In view of finite memory and large scale processing, the challenge is how to swap event-processing code in and out of memory intelligently.

Operating systems employ a paging technique to manage memory by reading and writing pages of data to and from secondary storage such as disk for use in primary storage such as memory. Operating system paging, however, is domain independent and thus may make suboptimal decisions about when and what to page in and out. Furthermore, paging techniques related to general-purpose operating systems do not scale well for high-throughput event processing and leads to excessive disk and memory accesses.

Details below generally pertain to event-processing system paging. Pageable event-processing queries are generated to support swapping queries, or portions thereof, in and out of memory. Support for paging can be provided by rewriting event-processing queries in accordance with one embodiment. For instance, query expressions can be automatically rewritten with page-in triggers, page-out triggers, as well as functionality for deferred loading and query preservation. Further, triggers can be specified with respect to event sequences or streams thus enabling exploitation of domain-specific characteristics of an event-processing system. Functionality can be also be inserted to collect data regarding query execution. Subsequently, the collected data can be analyzed for patterns useful in specifying page-in and page-out triggers. Furthermore, paging functionality can exploit features of an event-processing system including query operators and checkpointing, for example.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, event-processing system 100 is illustrated. In accordance with an observer design pattern, the event-processing system 100 is configured to accept subscriptions from one or more observers to one or more observable event sequences, or streams, and provide notifications to the one or more observers in line with corresponding subscriptions. The subscriptions can correspond to or include standing queries that execute continuously processing data as it arrives for the length of the subscription, as opposed to ad hoc queries that are meant to be run once. The type of notification can vary from simple alerts to a sequence of events that can also accept subscriptions.

The event-processing system 100 includes evaluation component 110, optimizer component 120, and paging component 130. The evaluation component 110 is configured to evaluate event-processing queries or more simply queries. The queries can be specified in terms of query expressions that include a plurality of query operators supported by the event-processing system for performing projection, filtering, and aggregation, among other things. Queries can be loaded in memory and upon receipt of data, the evaluation component 110 can evaluate the queries over the data and produce notifications.

The optimizer component 120 is configured to optimize received queries to improve evaluation performance. The optimizer component 120 can exploit algebraic properties of queries and data regarding system resource load and processing capabilities, among other things to generate a modified query for evaluation by the evaluation component 110. As non-limiting examples, the optimizer component 120 can coalesce a series of filters into a single filter, move a filter, or split a query for concurrent processing.

The paging component 130 is configured to swap queries into and out of memory. More specifically, the paging component 130 is configured to load and unload code and data associated with a query into and out of memory. Herein, loading a query into memory is referred to as paging in a query and unloading a query from memory is termed paging out a query. While paging in and out is used herein, it does not necessarily mean that a block of storage called a page is loaded in memory or unloaded from memory as conventionally done by an operating system. Rather, the block of storage can be of substantially any size associated with particular query code and data.

In accordance with one embodiment, the paging component 130 can reuse features and functionality of an event-processing system to perform paging. One approach is to build paging into a particular query execution engine, or the evaluation component 110 described herein. This, however, involves producing a low-level paging system with little abstraction involving schedulers, memory managers, and input/out managers, for example. A second approach, described herein, is to build on top of capabilities of the event-event processing and implement paging with query operators. As will be described further below, a query expression comprising one or more query operators can be rewritten to include support for paging. Moreover, high-level domain-specific characteristics of an event-processing system can be exploited for paging that are not available to low-level operating system paging mechanisms.

For example, consider a flight-tracking query that notifies an individual if that the individual's flight is going to be late. This query could be submitted upon booking of a flight but only needs to be active a day in advance of flight departure. Such a standing query is long living, potentially for months, between the time the query is submitted and the time the query is active. Since code corresponding to the query will not react to any events for a period, the code can be paged out and subsequently paged in a day before flight departure. This is a very trivial example because it deals with explicit time in the query Nevertheless, this example highlights use of knowledge of the query domain and event space to make intelligent decisions regarding when to page in and page out queries.

Figure 2:
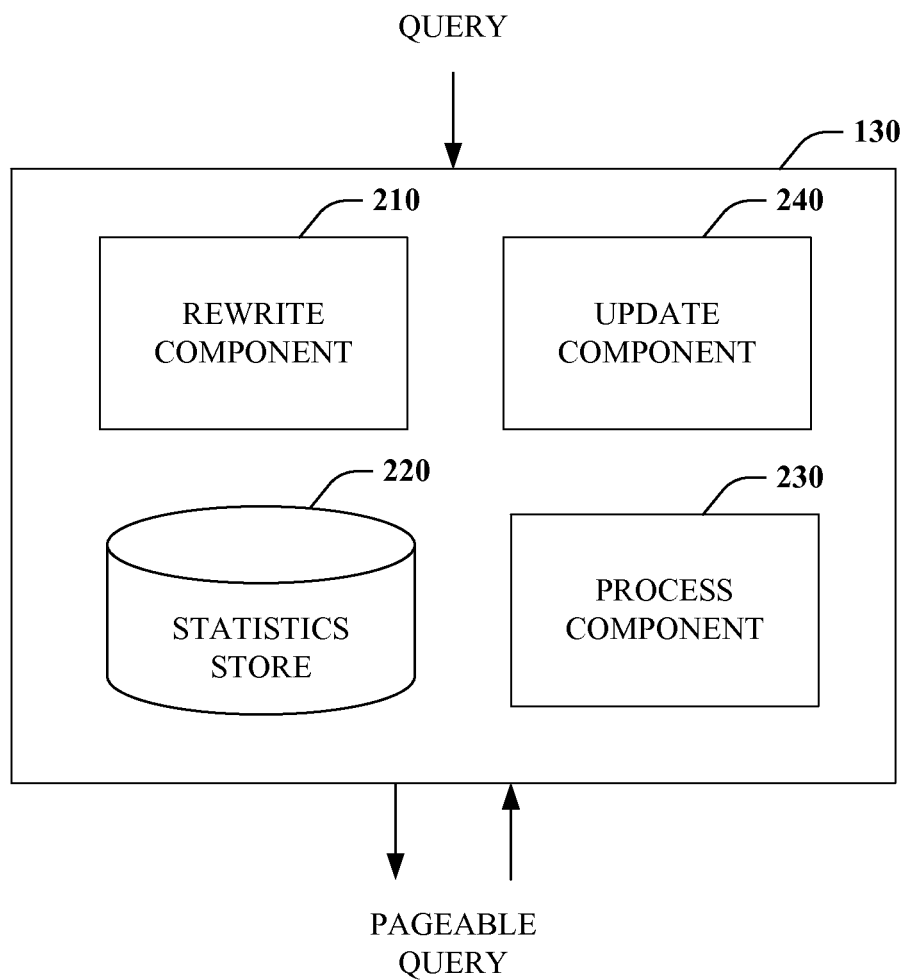
FIG. 2 is a block diagram of a representative paging component.

Turning attention to FIG. 2, a representative paging component 130 is depicted. The paging component 130 includes rewrite component 210, statistics store 220, process component 230, and update component 240. The rewrite component 210 is configured to rewrite query expressions in a manner that adds support for paging. In other words, rewrites turn queries into pageable queries. The rewrites can trigger paging based on arrival of events in an event sequence. Although not limited thereto, paging can be triggered based on a sequence of timer events or ticks. The rewrite can also involve adding a mechanism to trigger page out. Further rewrites can pertain to deferred loading as well as collecting and utilizing execution data to make paging decisions. In particular, queries or portions thereof can be injected with functionality to collect data regarding query execution and save the data in the statistics store 220. Such data can capture the number of events as well as when the events occur, among other things. The process component 230 is configured to analyze and process the data to detect patterns that may be useful in specifying a pageable query. For example, if event-processing activity takes place daily at 8 a.m. (e.g., because an event arrives on one of the query's inputs), the process component 230 can detect or infer this pattern. As a result, a page-in trigger can be daily before 8 a.m. and a page-out trigger sometime after 8 a.m. Where such data or information regarding patterns is available for the query or similar queries, the rewrite component 210 can utilize information to initiate rewrite a query into a pageable form. However, the rewrite component can also specify the query in a manner that allows subsequent update. The update component 240 is configured to update a pageable query based on patterns identified by the process component 230. In particular, page-in and page-out triggers can be altered to reflect current knowledge regarding a query and related events.

Figure 3:
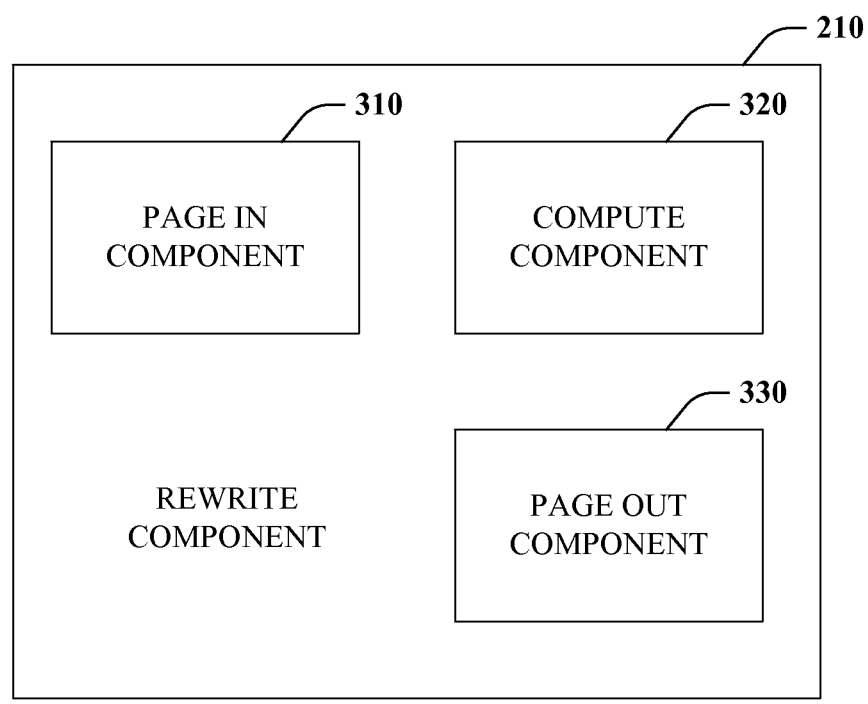
FIG. 3 is a block diagram of a representative rewrite component.

Turning attention briefly to FIG. 3, an exemplary rewrite component 210 is illustrated in further detail. As shown, the rewrite component 210 includes page in component 310, compute component 320, and page out component 330. The page in component 310 is configured to inject functionality into a query expression to trigger a page-in functionality that loads memory with code and potentially state data associated with the query operation. The page-in functionality can be trigged based on the occurrence of an event such as a timer tick or some other message. Further, the page in component 310 is configured to insert functionality that enables updating when to trigger a page-in, for example based on past execution statistics. The compute component 320 is configured to inject functionality that enables at least a portion of a query expression or computation associated therewith to be swapped into and out of memory. In one implementation, this can be accomplished by using deferred loading functionality of an event-processing system as well as operator state persistence in the form of checkpoint functionality. The compute component 320 is also configured to injection functionality to collect data concerning execution and save them to the statistics store 220. The page out component 330 is configured to inject functionality that triggers a page-out operation. This can be accomplished at least in part by exploiting checkpointing functionality of an event-processing system to save query code and state to a persistent store and initiating unloading of the code from memory, for example by setting a pointer to null and allowing the spaced to be reclaimed by a garbage collection mechanism. Functionality can also be added by the page out component 320 to enable updates as to when to trigger a page-out operation, for example based on execution statistics.

What follows are details associated with one exemplary implementation of aspect of the disclosure. The description starts with paging in query code and data with timers. That is followed by a description of activation patterns to page-in code. Finally, a description of paging out code and data is provided.

Various standing queries may be submitted a long time before they become active. Some of these queries may be long living. Consider a flight-tracking query. A standing query tracking a flight typically only needs to last for twenty-four hours, starting some time before check-in, for instance to suggest leaving for the airport or cancelling and lasting until sometime after landing, for example to suggest picking someone up at the airport. However, standing queries for flight tracking may be submitted to an event-processing system for processing upon booking of a flight. Furthermore, there may be a query for several people interested in the flight.

To describe such queries, time-based operators are often used to time-box a query's execution. For the flight query example, a "DelaySubscription" or "SkipUntil" operator may be used to delay processing events until sometime before the flight departs and a "TakeUntil" operator may be used to achieve a similar effect in terms of disposing of the query after the flight has landed. For example:

```
flights.DelaySubscription(departure - 12hr)
      .Where(f => f.Id == "BA49")
      .TakeUntil(landing + 12hr)
      .Subscribe(...)
```

The above query expression can be rewritten to support paging based on algebraic properties of the query. First, the "DelaySubscription" operator can generally commute with other query operators (e.g., some properties around absence of side-effects due to a subscribe may need to hold). In other words, the order of the "DelaySubscription" operator does not matter relative to other operators. Accordingly, the "DelaySubscription" operator can be pushed down closer to the consumer. In fact, the operator can be moved right in front of the "Subscribe" call as follows:

```
flights.Where(f => f.Id == "BA49")
      .TakeUntil(landing + 12hr)
      .DelaySubscription(departure - 12hr)
      .Subscribe(...)
```

Next, the "DelaySubscription" operator can be expanded into a more primitive form using the following algebraic identity:

xs.DelaySubscription(t)==Timer(t).SelectMany(_=>xs)

Here, the source of the "DelaySubscription" operator, "xs," ends up in the lambda body for the selector function of the "SelectMany" operator. At this point, checkpointing functionality associated with an event-processing system can be employed, specifically checkpointing for higher-order operators such as "SelectMany." It is not until an event arrives from the source of the "SelectMany" operator, in this case a timer pulse, that the body of the selector function has to be loaded into memory. The running example can be written as follows:

```
Timer(departure - 12hr).SelectMany(_ => flights.Where(f => f.Id == "BA49")
                                          .TakeUntil(Landing + 12hr))
.Subscribe(...)
```

The italicized portion of the query can be lifted out of the query by inserting a "trap" expression. By using the ability to define an observable (the type of the italicized portion) as a named artifact, the code portion can be removed. A new artifact can be defined as follows:

```
ctx.DefineObservable(someId, flights.Where(f => f.Id == "BA49")
                                .TakeUntil(landing + 12hr));
```

The artifact "someId" is an observable (e.g., type IObservable) that does not contain code but just an identifier. This identifier can be used as a stand in for the removed portion of the query thereby inserting a level of indirection. This allows the original query to be rewritten into is final form:

```
Timer(departure - 12hr).SelectMany(_ => someId)
.Subscribe(...)
```

This means the subscription with a particular query is delayed until twelve hours before departure. At that point, the "SelectMany" operator will receive an event and the query code will be swapped in, for example by reading the code from disk, compiling the code, and loading the code into memory. The result is that resident code for query logic is reduced significantly. The above final form assumes that the evaluation component 110 does not perform eager inlining of artifacts referred to in the query, especially if these occur in inner positions (e.g., lambda expressions) but rather does so lazily by deferring inlining until needed. Such behavior can be either intrinsic to the system or added by the rewriter component 210 as follows:

```
Timer(departure - 12hr).SelectMany(_ => Defer(someId))
.Subscribe(...)
```

In and of itself, the "SelectMany" operator decouples an outer "source" observable and subscriptions to one or more "inner" observables. The inner portions can be checkpointed separately from the outer portion, and are only instantiated upon receiving an event from outer source subscription, such as the timer sequence in this example. However, this can be further optimized further by reducing the pattern to a special operator if it proves beneficial in terms of resource utilization. For instance, a "ContinueWith" operator could be employed as follows:

```
Timer(departure - 12hr).ContinueWith(someId)
.Subscribe(...)
```

Further optimizations can be made by exploiting timer properties, for example by coalescing multiple timers into coarser grained master timers that can be used to trigger instantiation of timers at the next level. This can be beneficial in that objects that refer to the timer resource can be reused, rather than instantiating multiple timer objects across different standing queries. These object can be coalesced with a handler list consuming O(n) space. Consider the following queries:

```
Timer(t1).SelectMany(_ => xs.Bar( ).Foo( )).Subscribe(. . .)
Timer(t2).SelectMany(_ => ys.Qux( ).Baz( )).Subscribe(. . .)
```

Using techniques described above, inner portions of "SelectMany" operators can be paged out. However, the resident "SelectMany" operators can be further optimized away by coalescing timers. The algebraic rewrite for timers is as follows:

Timer($t$)==Timer($N*(t/N)$).SelectMany(_=>Timer($t$ % $N$))

Here, a timer with due time "t" into a coarser grained timer with a resolution of "N." Employing common sub-expression elimination, timer resources can now be coalesced. For example, if "N" is set to twenty-four hours, it is not until midnight of the due time day that the remainder timers are instantiated. Thus, solely one day timer needs to be resident per day. Assuming that timers "t1" and "t2," in the example, result in the same day "d," then:

```
Timer(d).SelectMany(_ => Timer(t1 % N))
    .SelectMany(_ => xs.Bar( ).Foo( )).Subscribe(. . .)
Timer(d).SelectMany(_ => Timer(t2 % N))
    .SelectMany(_ => ys.Qux( ).Baz( )).Subscribe(. . .)
```

Furthermore, the SelectMany operators can be turned "inside out" using the following identity (if some prerequisites about side-effects hold):

```
xs.SelectMany(_ => ys).SelectMany(_ => zs)
==
xs.SelectMany(_ => ys.SelectMany(_ => zs))
```

As a result, the following query plans are produced:

```
Timer(d).SelectMany(_ =>  Timer(t1 % N)
                          .SelectMany(_ => xs.Bar( ).Foo( )))
        .Subscribe(. . .)
Timer(d).SelectMany(_ =>  Timer(t2 % N)
                          .SelectMany(_ => ys.Qux( ).Baz( )))
        .Subscribe(. . .)
```

Not only can "Timer(d)" be reused, the bodies of the "SelectMany" operators can be paged out. The rewriter component 210 can also recursively re-apply this technique to get the next level of coarse-grained timer (e.g. with a resolution M<N, such as 1 hour).

Notice the above-described paging scheme has the benefit of fetching required expressions ahead of time, so the cost of paging in does not adversely affect the accuracy of the timer. This parameter can be adjusted, for instance based on a time tolerance parameter passed to the query. For example, one could round timers to a one-minute resolution to boost the likelihood of reuse.

While timer-based deferral of code loading can be used quite often, as described above, timer-based deferral of code requires queries to have a certain shape. Queries, however, can have an arbitrary shape. For example, some event sequence or stream other than timer can be used as a query source. In this case, algebraic rewrites alone may not be sufficient.

Rather, queries can be rewritten with code to gather statistics regarding query execution, which can be saved to the statistics store 220. The statistics store 220 can thus save historical statistics regarding query execution. The Process component 230 is configured operate with respect to historical statics and determine and/or infer useful information for paging, such as when and how often events occur. The rewrite component 210 or the update component 240 can employ data or information from the process component 230 in the specifying of queries for paging, namely page-in and page-out triggers.

Consider a source that produces events infrequently. Here, the remainder of the query could be defer-loaded. More generally, queries may have many sources, but the techniques described herein are equally applicable. Single-source queries are considered for simplicity. For example, consider the following query expression:

weather("SEA").Where($w$=>$w$.Temperature>30 C).Bar( ).Foo( )

While the parameterized stream for weather in Seattle may produce events frequently, the chances of an event passing the predicate (temperature over 30 degrees Celsius) are rather slim. Such information can be obtained by query instrumentation to acquire cardinality (or rather velocity given the importance of the time dimension in an event-processing system) estimates that can be accounted for in rewriting the query:

let xs = weather("SEA").Where(w => w.Temperature > 30C) in xs.Measure( ).Bar( ).Foo( )

In here, the "Measure" operator takes in "xs" as the source, not only to subscribe to it, but also to associate measurements with that sub-expression. For example, the "Measure" operator can store historical records of the rate of events produced by the sub-expression. If "weather("SEA")" were to be instrumented in a similar way, the ratio of ingress and egress for the sub-expression could be computed, too. It should be appreciated that many statistics can be obtained from this, of various orders of derivatives (event count, velocity, acceleration, jerk; time to process, etc.).

Notice that the parameterization of the "weather" stream provides for filtering as well, but the same observations would apply if the stream were to be a massive "firehose" that needs filtering using the "Where" operator:

weather.Where($w$=>$w$.City=="SEA" && $w$.Temperature>30 C).Bar( ).Foo( )

In such cases, queries could be normalized, for example with several consecutive "Where" operator clauses, to put the most restrictive predicate first. For what follows, assume that the temperature condition causes infrequent triggering of events, or more generally, in:

$xs$.Where($f$).Select($p$) . . .

the source "xs" produces events infrequently, as determined by the process component 230. At this point, it would make sense to make the event flow of "xs" trigger the paging in of the remainder of the query logic. To do so, techniques similar to the timers can be use, but keeping in mind that "xs" may have a cardinality of more than one, so it is desirable to page-in the computation once and not for every message. In a general form, the following rewrite is possible:

xs.F( )==xs.Publish(ys=>ys.First( )SelectMany
(y=>ys.StartWith(y).F( )))

This may seem quite complicated, but is required in the general case where side effects are possible. In particular, it is may be undesirable to subscribe to "xs" multiple times, because the creation of a subscription may have a side effect such as contacting an external service. That is where the use of the "Publish" operator comes in. If "xs" were to be a hot stream, meaning notifications are produced regardless of subscriptions as opposed to starting to produce notifications in response to a subscription, the "Publish" operator can be removed. To simplify the code above, assume "xs" is a hot stream one can subscribe to as many times as desired:

xs.F( )==xs.First( ).SelectMany(x=>xs.
StartWith(x).F( ))

Now it becomes clearer that loading is deferred for the expression "F," which could be arbitrarily large (e.g., Where (f).Select(p)), until the first event on "xs" arrives. For the original query expression "F" not to miss that event, the rewriter component 210 can re-insert the expression in front of the new subscription to "xs." This assumes the implementation of "StartWith" operator is synchronous and will not miss events received on "xs" between when "x" was retrieved and the inner subscription to "xs" is made. If this guarantee does not exist, other operators can be woven in to keep a message buffer.

Either way, from here on, the same techniques as the ones described for timers apply. The inner portion of the "SelectMany" operator can be paged in lazily upon arrival of a message (for timers this was a tick). A specialized operator "PageWhenFirstEventArrives" can be built that does all of this:

xs.PageWhenFirstEventArrives(ys=>ys.F( ))

Such an operator can be built as the composition of operators as shown above, or be built as its own primitive that uses the same higher-order operator base classes as the "SelectMany" operator to reuse existing lazy loading and checkpointing mechanisms. That is, no cost for checkpointing and memory residency is paid for "ys.F( )" until the first event arrives. Additionally, the parameter to this operator can be abstracted into a defer-loaded artifact as follows:

ctx.DefineObservable(someId, ys => ys.F( ));
xs.PageWhenFirstEventArrives(someId)

Event arrival triggering paging can lead to delays in message processing due to loading time. In collaboration with gathering statistics, this could be mitigated if the next message arrival can be predicted, for example from historical data. This information can then be used to create an ahead-of-time signal. Regardless of this, event-based triggering is still needed in case the prediction was wrong. Using this observation, the paging technique can be generalized to allow for a page-in event which goes beyond "xs.First( )" or a timer. That is, consider the following operator:

xs.PageIn(ys=>pageInEvent,ys=>ys.F( ))

Here, "xs" is fed into two lambda expressions, being aliased as "ys." The second lambda is where pageable code is inserted, as previously described. The first lambda provides for a signal, which can be an arbitrary observable expression that can use the source "xs" (aliased as "ys"). For example, if it is desirable to page-in the computation when the first event arrives or when a predictive timer expires, "xs.F( )" can be rewritten as follows:

xs.PageIn(ys=>Merge(ys.First( ),
Timer(t)),ys=>ys.F( ))

By reusing the rich composition of event-processing operators, a very flexible means is provided to build a paging system.

Given the above described mechanism to page in code representing an event processing computation, two runtime artifacts result, namely the code that was paged in and the state accumulated by a newly started computation. When a resulting computation is infrequently fed with new incoming events (and assuming that timers are modeled as event streams, too), it is advantageous to be able to page out the computation, including code and state.

An event-processing system can include a mechanism to checkpoint state. Accordingly, existing operator support for checkpointing state can be used to support paging to effectively page out a running computation.

In order to provide flexibility, the "PageIn" operator described above can be incorporated into an exemplary "Page" operator that also receives a page-out signal:

```
IObservable<T> Page<T, I, R, O>(IObservable<T> source,
                                Func<IObservable<T>, IObservable<I>>
                                pageIn,
                                Func<IObservable<T>, IObservable<R>>
                                compute,
                                Func<IObservable<T>, IObservable<O>>
                                pageOut);
```

The functionality of the operator can be built in a compositional manner, as illustrated before for the page-in portion. Operationally, the "Page" operator does several things during a lifecycle. The operator subscribes to a source introducing a subject to broadcast messages to the supplied functions without duplicating side effects of subscriptions to the source and without losing messages either by using locking schemes or bounded buffering. Additionally, the "Page" operator repeatedly performs a several actions. First, feed the broadcasted source to the "pageIn" function and subscribe to its result. Upon receiving a notification, feed the broadcasted source to the "compute" function, feed the resulting events to a downstream observer, and feed the broadcasted source to the "pageOut" function. The "pageOut" function could also be fed more data to make decisions, by way of example, and not limitation, the result of computation can be passed to the "pageOut" operator to enable measurement of an event rate and page out when the rate has been at zero for a predetermined prolonged period. Upon receiving a notification associated with the "pageOut" function checkpoint current computation state, page out runtime artifacts, and repeat the lifecycle.

An example usage is shown below:

```
Page(source:  xs,
     pageIn:  ys => Merge(ys.First( ), Timer(t1)),
     compute: ys => ys.F( ),
     pageOut: ys => ys.Throttle(t2))
```

Even the "pageOut" function can be paged out until the "pageIn" function has produced a message. That is, the rewrite component 210 can put defer-loaded arguments in place as follows:

```
Page(source: xs,
     pageIn:  ys => Merge(ys.First( ), Timer(t1)),
     compute: Defer(someId1),
     pageOut: Defer(someId2))
```

Here, "someId1" and "someId2" are defined as previously described. Operationally, this operator subscribes to "xs" and will page in the computation upon receiving a first event or the arrival of a predictive event. The computation is paged out when the throttled input sequence receives an event; that is, if an input event was not followed by another event within a time "t2 ," it propagates into the page-out function and causes a page out due to more than "t2 " time of inactivity.

The update component 240 is configured to update or change operation of paging based on current data or information obtained from the process component 230 in response to captured historical query execution data. Use of defined artifacts, or identifiers provide a level of indirection that can be used dynamically change paging functions associated with the "Page" operator.

```
Page(source: xs,
     pageIn:  Defer(someId3),
     compute: Defer(someId1),
     pageOut: Defer(someId2))
```

In the fragment above, a deferred load for "pageIn" has also been inserted. While this may be wasteful for an initial subscription, it can pay off if the query repeatedly pages out and back in. At that point, the rewrite component 210 or a separate update component 240 designated for updates can re-define "someId3" and "someId2" at some point to make the page-out behavior less aggressive and/or to make the page-in behavior more proactive. To enable updating, the expressions representing these page functions should not be eagerly inlined, hence the use of a "Defer" operator.

Figure 4:
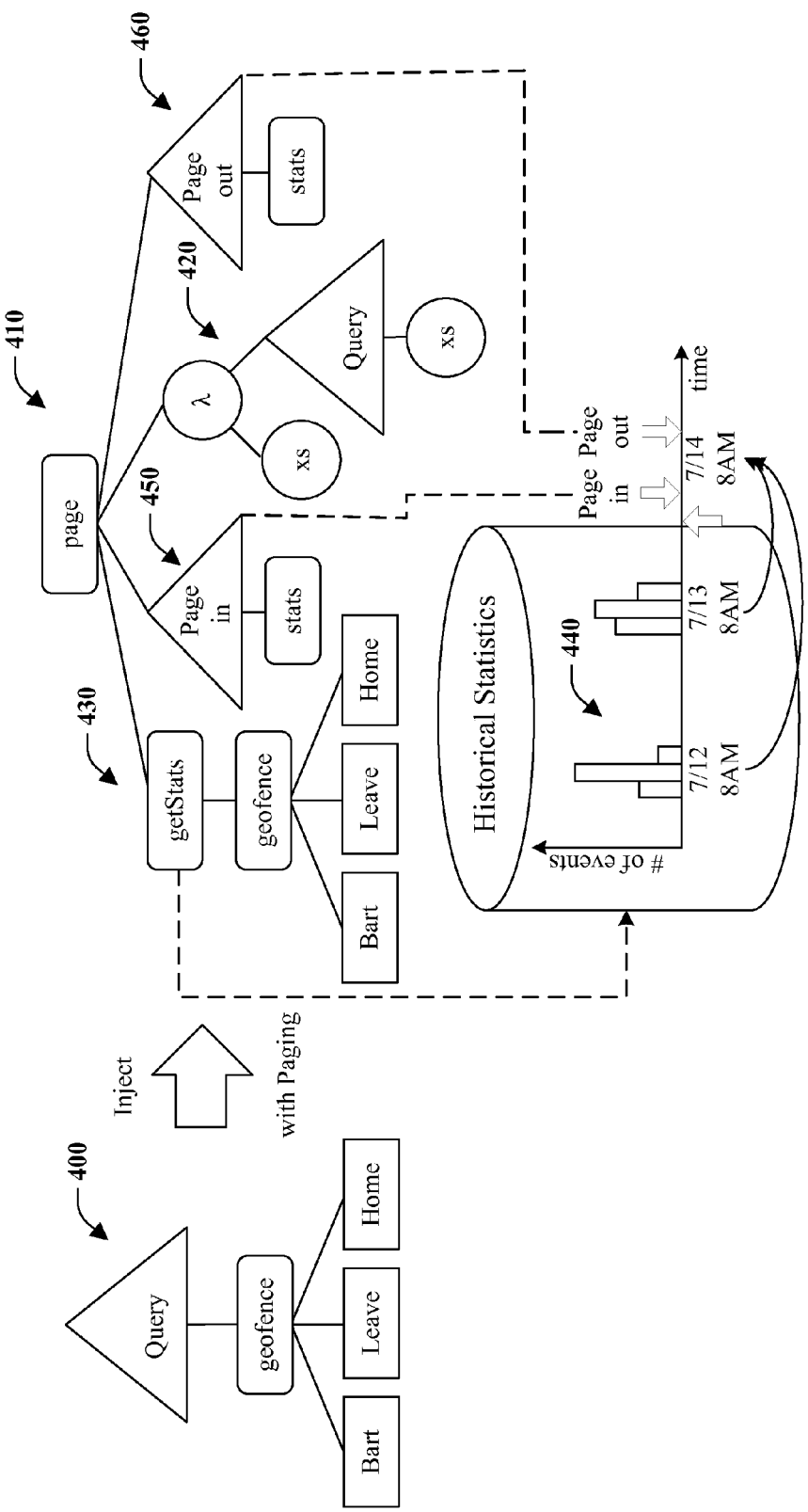
FIG. 4 is a graphical illustration of a rewriting with statistics gathering and paging functions based on historical data.

FIG. 4 is a graphical illustration of a rewriting with statistics gathering and paging functions based on historical data. Starting on the left, an initial a geo-fencing query 400 is received. The geo-fencing query 400 sets a virtual barrier and generates and event when "Bart leaves home," based on the parameters "Bart," "leaves," and "home." The geo-fencing query 400 can be rewritten to produce a pageable version 410 of the geo-fence query. The paging function can be a generalization of a "SelectMany" operator. Here, the geo-fencing query 400 is rewritten in two parts, the first part 420 represent code that needs to be resident in memory and the second part 430 represents code that does not have to be resident in memory except between the occurrence of a page-in event and a page-out event. Statistics gathering code is also added to the second portion 430 of the query, which collects statistical data regarding query execution and saves the data to historical statistics store 440. Rewrites also inject page-in functionality 450 and page-out functionality 460 that controls when the second portion 430 of the query is swapped into and out of memory. Furthermore, the page-in functionality 450 and the page-out functionality 460 are determined based on statistical data. As shown in historical statistics store, statics can gather based on prior query execution noting when the geo-fence is typically broken for the parameters "Bart," "leaves," and "home." It can be determined or inferred based on the data that the geo-fence is typically broken around 8 a.m. Accordingly, the page-in functionality 450 can be set to trigger before 8 a.m. (e.g., 7:45 a.m.) and the page-out functionality can be set to trigger after 8 a.m. (e.g., 8:15). Utilizing more advanced analysis, such as machine learning, it may be inferred that the trigger for the query is around 8 a.m. on weekdays and around 10 a.m. on weekends. Thus, the event sequence for page-in and out events may change from a twenty-four hour periodic timer (e.g., every day at 7:45 page in) to a more complex sequence that accounts for the discovered pattern. Returning back briefly to FIG. 1, notice that the optimizer component 120 and the paging component 130 are illustrated as separate entities. It is possible that the optimizer component 120 can suggest a query optimization that is essentially undone by the paging component 130. In other words, paging component 130 can de-optimize or reverse optimize an optimized query to make the query pageable. For example, the optimizer component 120 can outline double "SelectMany" operators, but the paging component 130 can reverse that and inline the operators. In accordance with another embodiment, functionality of the paging component 130 can be embedded within the optimizer component 120 such that the result of the optimizer component is an optimized pageable query.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the process component 230 can employ such mechanisms to infer an active time period for a standing query to facilitate determining when to page in and page out.

In view of the exemplary systems described above, methodologies that may be implemented in accordance with the disclosed subject matter will be better appreciated with reference to the flow charts of FIGS. 5-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 5:
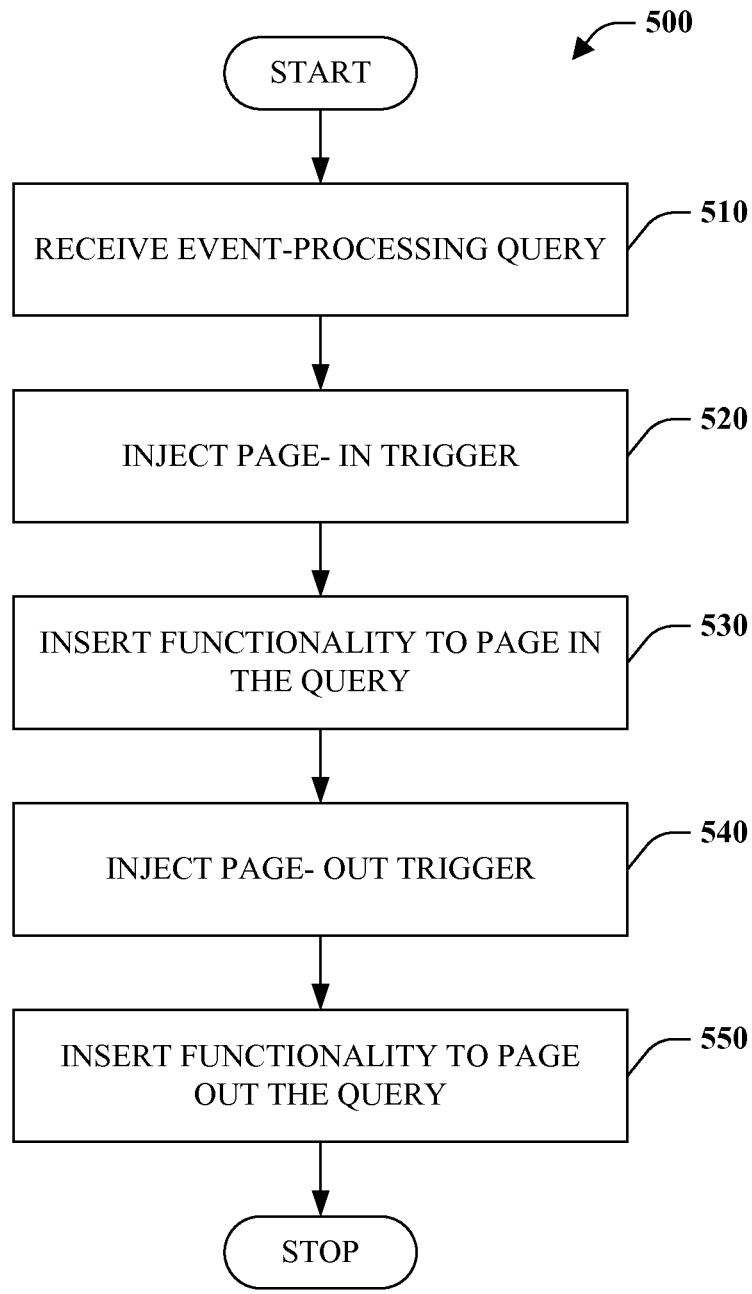
FIG. 5 is a flow chart diagram of a method of generating a pageable query in an event-processing system.

Referring to FIG. 5, a method 500 of generating a pageable query in an event-processing system is illustrated. At reference numeral 510, a standing event-processing query is received, retrieved, or otherwise obtained or acquired. The standing event-processing query is continuously evaluated over a sequence or stream of events over time.

At numeral 520, a page-in trigger is injected into the query. The page-in trigger identifies when to load a query, or portion thereof, in memory. Although the page-in trigger can be defined after the occurrence of an event that is processed by a query, it is preferable that the page-in trigger be specified prior to occurrence of event that is processed by the query. This may be able to be determined based on the parameters and algebraic properties of query operators. Additionally or alternatively, data collected related to execution of the query can be utilized to determine and update the page-in trigger.

At reference 530, functionality to page in, or, in other words, load in memory, a query, or portion thereof, is inserted. In accordance with one implementation, the page-in functionality can exploit event-processing system facilities including lazy or deferred loading of inner sequences of a "SelectMany" operator as well as a checkpointing mechanism to load the query, or portion thereof, including code and data capturing state. Furthermore, functionality can be injected to acquire data regarding execution of the query. Active times, among other things, can be predicted from this data and used to set or update page-in and page-out triggers.

A page-out trigger is injected at numeral 540. The page-out trigger indicates when the query can be removed or unloaded from memory. For example, this can be after a predetermined time or after a predetermined time of inactivity, among other things. Furthermore, the page-out trigger can be generated and updated based on collected execution data such as predicted activity times or processing time.

At reference numeral 550, functionality to page out the query can be inserted. In accordance with one implementation, the page-out functionality can exploit state persistence associated with checkpointing provided by the event-processing system. For example, the code and state of the code can be saved to a persistent data store. Subsequently the query can be removed or unloaded from memory. This can be done directly for example by deallocating memory or indirectly, for instance by setting a null pointer or decrementing a reference counter to zero to initiate garbage collection.

Figure 6:
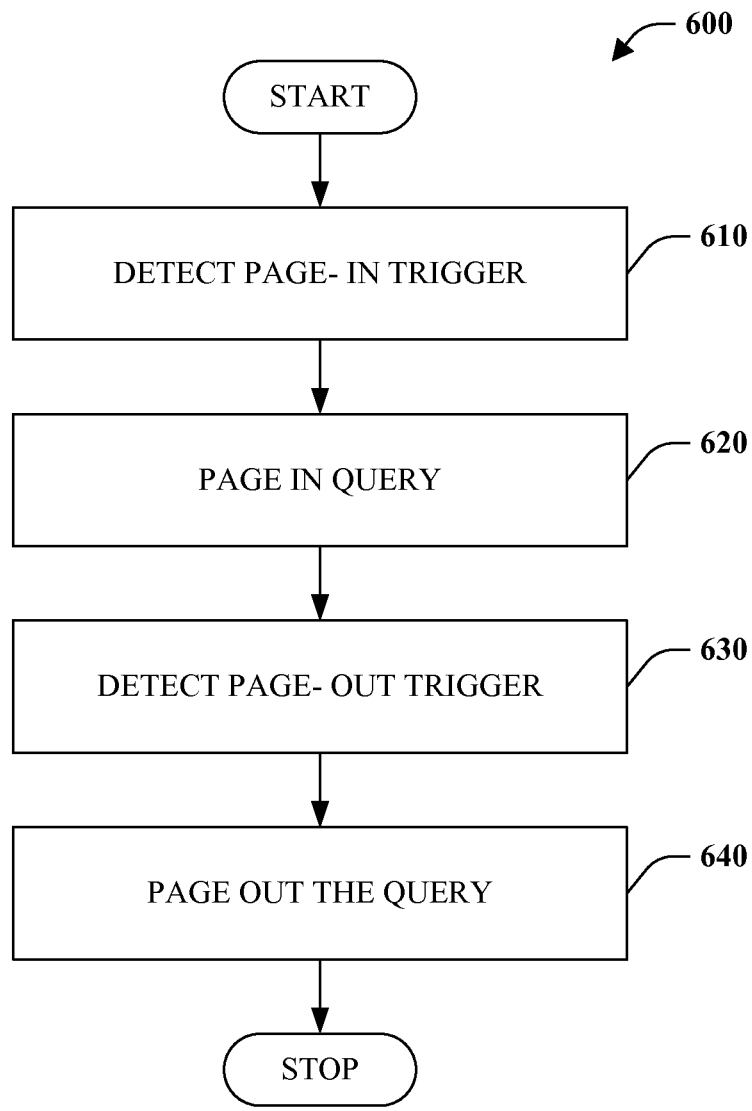
FIG. 6 is a flow chart diagram of a method of paging a query.

FIG. 6 depicts a method 600 of paging query in and out of memory. At numeral 610, a page-in trigger is detected. At reference, 620, a standing event processing query, or portion thereof, comprising code and potentially data capturing state is paged in. In other words, code required to evaluate a query over data that was previously not in memory is loaded into memory. In accordance with one implementation, functionality of a query processing system that pertains to deferred loading of code can be employed to page in a query. At reference numeral 630, a page-out trigger can be detected. Next, at 640, the query or a portion thereof can be paged out. In one implementation, checkpointing facilities of a query processing system can be utilized to save code and state to a persistent data store. Subsequently, the query can be removed from memory directly by deallocating memory or indirectly by setting a pointer to null or decrementing a reference counter to initiate garbage collection. In accordance with one embodiment, the entire query, or portion thereof need not be paged out rather solely a subset of the query can be paged out. For example, in a situation where there are nested queries, a strategy can be employed to selectively page out parts at any level, such as paging out the highest memory-consuming subtree.

Figure 7:
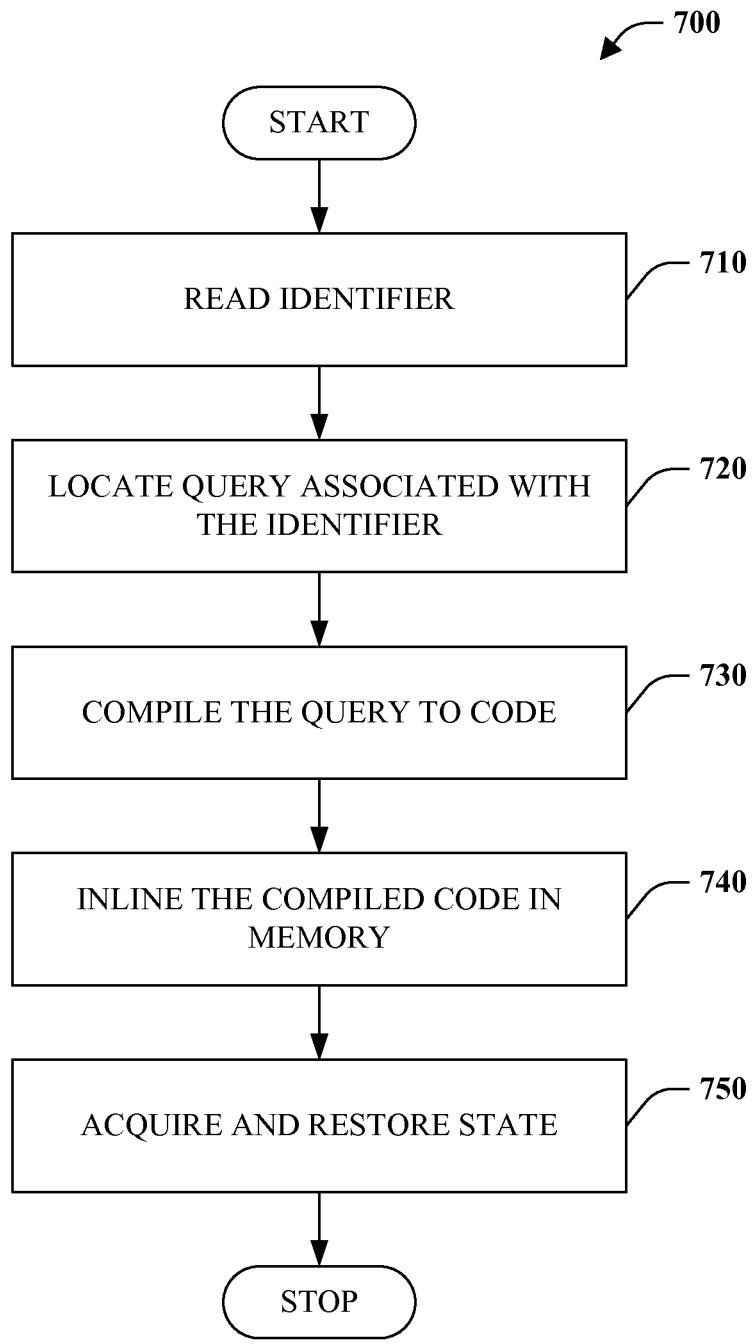
FIG. 7 is a flow chart diagram of a method of paging in a query.

FIG. 7 illustrates a method 700 of paging in query. At reference numeral 710, an identifier is read. In accordance with one aspect of the disclosed subject matter, one level of indirection can be employed wherein solely a reference to a query, namely an identifier, is resident in memory. This provides a mechanism to defer loading of the query. At reference numeral 720, a query or portion thereof is located that is associated with the identifier. For example, a dictionary storage structure or key-value store can store the query. In this case, the identifier is used as the key to acquire the query stored as data. At 730, the query or portion thereof is compiled into executable code. At numeral, 740, the executable code is inlined in memory. Stated differently, the executable code is loaded into memory replacing the identifier. Finally, at reference numeral 750 state related to the query is acquired from persistent storage and restored. Of course, if it is the first time this query has been paged in the state can be some initial state or no state at all.

Figure 8:
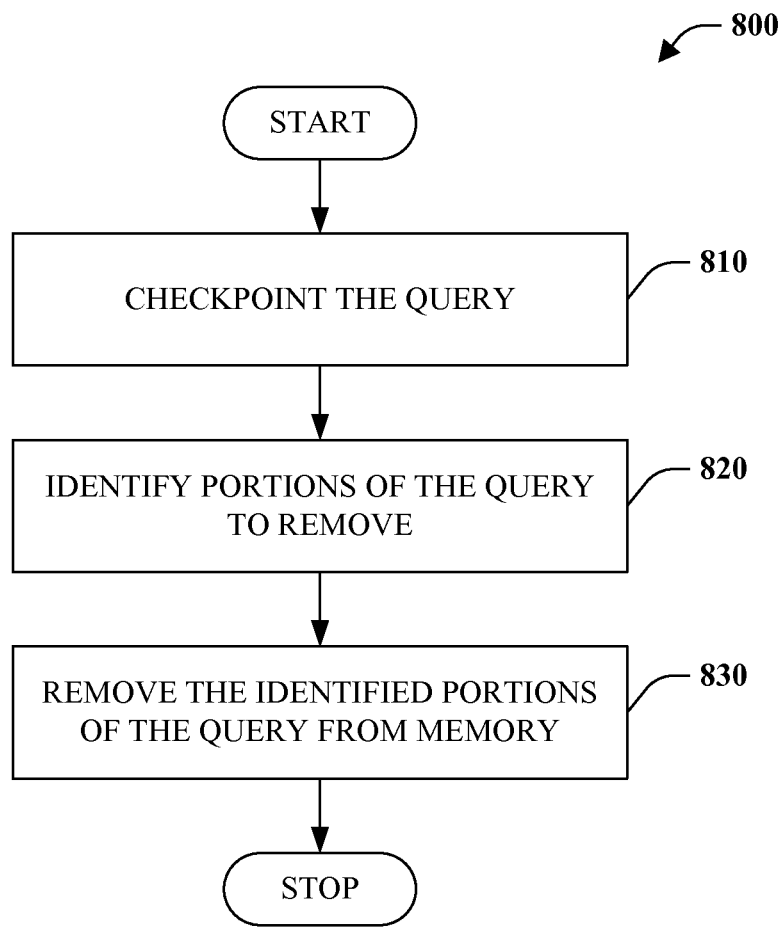
FIG. 8 is a flow chart diagram of a method of paging out a query.

FIG. 8 is a flow chart diagram of a method 800 of paging out a query. At reference numeral 810, the query or portion thereof is checkpointed. This can correspond to saving to a persistent storage an identifier linked to the query, the query itself, and the state of the query. In accordance with one embodiment, this checkpointing functionality can be provided by an event-processing system and merely invoked for use in paging out a query. At reference numeral 820, portions of the query to remove from memory are identified. In accordance with one embodiment, substantially the entire query, or all portions, can be removed from memory except for any required hooks to page in the query. In accordance with another embodiment, solely a subset of the query is removed from memory such as the highest memory consumption portion. In one instance, queries can be nested and a strategy can be implemented to selectively remove portions at any level. At reference numeral 830, the identified portions of the query are removed from memory. For example, the query can be directly deallocated from memory or indirectly garbage collected by setting a reference pointer to null or decrementing a reference counter to zero.

Any data that can be represented as a sequence of events or an event stream can be used as part of a decision process for a page in and page out capability. In one particular instance, system events, for example associated with physical memory and central processing unit, can be represented as an event stream. Conventionally, operating system based paging mechanisms deal exclusively with these types of system metrics. These metrics are secondary to the domain specific decision process described herein. In effect, knowledge of the domain reduces edge cases where system level metrics are utilized to page queries in and out of memory. However, for event storms, which are situations where a large number of events occur over a relatively short period of time, or times when predictive power is not good, the event-processing system can fall back to paging based on system events to avoid overcommitment. Furthermore, in a distributed environment event processing based on system events can be used to prompt self-balancing of load by migrating computation to different machines Aspects of this disclosure document are applicable to large scale distributed processing as small scale device processing. For example, aspects of this disclosure can be implemented in conjunction with a distributed event-processing system or serviced that processes many queries of many users. In this scenario, paging can increase memory density to aid processing large numbers of queries. Aspects are also applicable to a single computing device such as a phone. Here, paging can be employed to remove one or more user queries from memory and a background processing to conserve battery power, for instance.

The subject disclosure supports various products and processes that perform, or are configured to perform, various actions regarding paging in an event-processing system. What follows are one or more exemplary systems and methods A system comprises a processor coupled to a memory, the processor configured to execute the following computer-executable component stored in the memory: a first component configured to receive an event-processing query; and a second component configured to rewrite the event-processing query in a pageable form that supports swapping of at least a portion of the query into and out of the memory. The system of claim can also comprise a third component configured to inject a page-in trigger that initiates loading of the at least the portion of the event-processing query into the memory. In one instance, the page-in trigger is generated based on historical data related to execution of the event-processing query. The system can further comprise a third component configured to inject a page-out trigger that initiates removal of the at least the portion of the event-processing query from the memory. In one instance, the page-out trigger is generated based on historical data related to execution of the event-processing query. The system can further comprise a third component configured to gather data regarding execution of the event-processing query.

A method comprises employing at least one processor configured to execute computer-executable instructions stored in a memory to perform the following acts: receiving an event-processing query; and generating a pageable query based on the event-processing query, wherein the pageable query supports swapping of at least a portion of the event-processing query into and out of memory. The method further comprises injecting a page-in trigger to initiate loading of the at least the portion of the event-processing query into the memory. The method further comprises injecting a page-out trigger to initiate removing the at least the portion of the event-processing query from the memory. The method further comprises inserting a mechanism to defer loading of the at least the portion of the event-processing query into memory until triggered. The method further comprises inserting a mechanism to collect data related to execution of the event-processing query. The method further comprises employing machine learning with respect to the data to infer at least one of a page-in trigger or page-out trigger. The method further comprises inserting a mechanism to save state of the at least the portion of the event-processing query in connection with swapping the event-processing query out of the memory. The method further comprises inserting a mechanism to recover state of the at least the portion of the event-processing query in connection with swapping the event-processing query into the memory. The method further comprises inserting a mechanism to swap out of the memory a subset of the at the least the portion of the event-processing query.

A computer-readable storage medium having instructions stored thereon that enable at least one processor to perform a method upon execution of the instructions, the method comprising: detecting a page-in trigger with respect to an event sequence; and loading at least a portion of an event-processing query into memory in response to detecting the page-in trigger. The method of loading the event-processing query can comprise locating a data representation of the at least the portion of the event-processing query based on an identifier; and compiling the data representation to executable code. The method can further comprise detecting a page-out trigger with respect to the event sequence; and unloading the at least the portion of the event-processing query from memory in response to detecting the page-out trigger. The method of unloading the event-processing query can comprise initiating a state capture operation that captures current state of the event-processing query. The method of unloading the event-processing query can comprise unloading solely a subset of the at least the portion of the event-processing query.

Aspects of the subject disclosure pertain to the technical problem of management of computer memory in conjunction with processing standing queries. The technical features associated with addressing this problem include employment of an event-processing system to manage memory by rewriting queries to support paging in and out of memory. Accordingly, aspects of the disclosure exhibit technical effects with respect to efficient use of resources including but not limited to memory conservation and increased processing speed.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
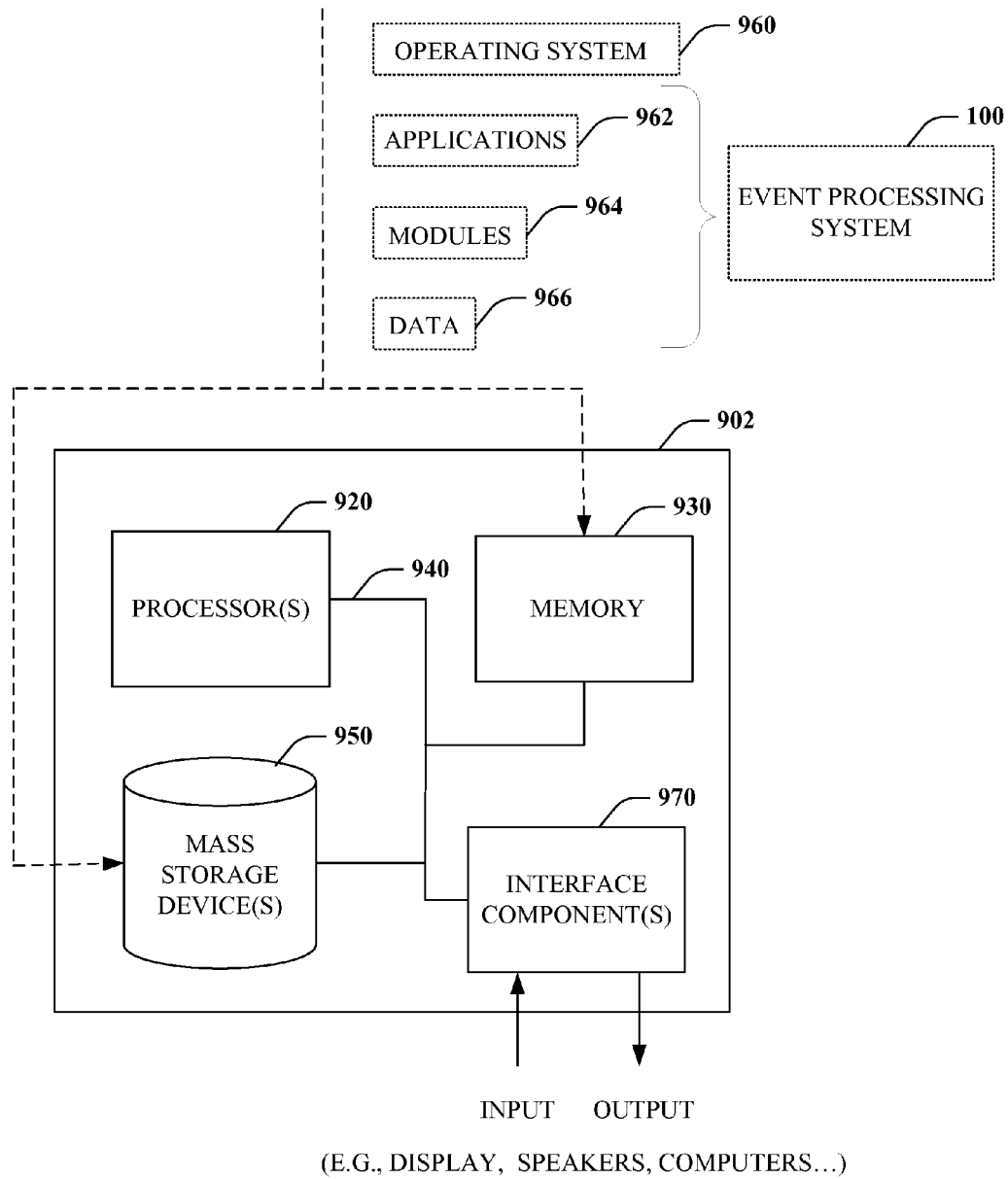
FIG. 9 is a schematic block diagram illustrating a suitable operating environment for aspects of the subject disclosure.

In order to provide a context for the claimed subject matter, FIG. 9 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory devices.

With reference to FIG. 9, illustrated is an example general-purpose computer or computing device 902 (e.g., desktop, laptop, tablet, watch, server, hand-held, programmable consumer or industrial electronics, set-top box, game system, compute node . . . ). The computer 902 includes one or more processor(s) 920, memory 930, system bus 940, mass storage device(s) 950, and one or more interface components 970. The system bus 940 communicatively couples at least the above system constituents. However, it is to be appreciated that in its simplest form the computer 902 can include one or more processors 920 coupled to memory 930 that execute various computer executable actions, instructions, and or components stored in memory 930.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) can be a graphics processor.

The computer 902 can include or otherwise interact with a variety of computer-readable media to facilitate control of the computer 902 to implement one or more aspects of the claimed subject matter. The computer-readable media can be any available media that can be accessed by the computer 902 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 902. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 930 and mass storage device(s) 950 are examples of computer-readable storage media. Depending on the exact configuration and type of computing device, memory 930 may be volatile (e.g., RAM), non-volatile (e.g., ROM, flash memory . . . ) or some combination of the two. By way of example, the basic input/output system (BIOS), including basic routines to transfer information between elements within the computer 902, such as during start-up, can be stored in nonvolatile memory, while volatile memory can act as external cache memory to facilitate processing by the processor(s) 920, among other things.

Mass storage device(s) 950 includes removable/non-removable, volatile/non-volatile computer storage media for storage of large amounts of data relative to the memory 930. For example, mass storage device(s) 950 includes, but is not limited to, one or more devices such as a magnetic or optical disk drive, floppy disk drive, flash memory, solid-state drive, or memory stick.

Memory 930 and mass storage device(s) 950 can include, or have stored therein, operating system 960, one or more applications 962, one or more program modules 964, and data 966. The operating system 960 acts to control and allocate resources of the computer 902. Applications 962 include one or both of system and application software and can exploit management of resources by the operating system 960 through program modules 964 and data 966 stored in memory 930 and/or mass storage device (s) 950 to perform one or more actions. Accordingly, applications 962 can turn a general-purpose computer 902 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, event-processing system 100 or portions thereof, can be, or form part, of an application 962, and include one or more modules 964 and data 966 stored in memory and/or mass storage device(s) 950 whose functionality can be realized when executed by one or more processor(s) 920.

In accordance with one particular embodiment, the processor(s) 920 can correspond to a system on a chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the event-processing system 100 and/or associated functionality can be embedded within hardware in a SOC architecture.

The computer 902 also includes one or more interface components 970 that are communicatively coupled to the system bus 940 and facilitate interaction with the computer 902. By way of example, the interface component 970 can be a port (e.g., serial, parallel, PCMCIA, USB, FireWire . . . ) or an interface card (e.g., sound, video . . . ) or the like. In one example implementation, the interface component 970 can be embodied as a user input/output interface to enable a user to enter commands and information into the computer 902, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 970 can be embodied as an output peripheral interface to supply output to displays (e.g., LCD, LED, plasma . . . ), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system comprising:
a processor coupled to a memory, the processor configured to execute computer-executable instructions stored in the memory that when executed perform acts comprising:
receiving an event-processing query, as part of a subscription, for continuous evaluation until the subscription is canceled; and
rewriting the event-processing query automatically in a pageable form, wherein the pageable form enables swapping of at least a portion of the event-processing query into and out of memory based on one or more injected triggers specified in terms of at least one characteristic of one or more of the event-processing query or an event sequence over which the event-processing query operates.

2. The system of claim 1 further comprises injecting a page-in trigger into the pageable form that initiates loading of the at least the portion of the event-processing query into the memory.

3. The system of claim 2, the page-in trigger is generated based on historical data related to execution of the event-processing query.

4. The system of claim 1 further comprises injecting a page-out trigger into the pageable form that initiates removal of the at least the portion of the event-processing query from the memory.

5. The system of claim 4, the page-out trigger is generated based on historical data related to execution of the event-processing query.

6. The system of claim 1 further comprises gathering data regarding execution of the event-processing query.

7. A method comprising:
employing at least one processor configured to execute computer-executable instructions stored in a memory to perform the following acts:
receiving an event-processing query, as part of a subscription, for continuous evaluation until the subscription is canceled; and
generating a pageable query automatically based on the event-processing query, wherein the pageable query supports swapping of at least a portion of the event-processing query into and out of the memory based on at least one characteristic of one or more of the event-processing query or an event sequence over which the event-processing query operates.

8. The method of claim 7 further comprises injecting a page-in trigger into the pageable query that initiates loading of the at least the portion of the event-processing query into the memory.

9. The method of claim 7 further comprises injecting a page-out trigger into the pageable query that initiates removing the at least the portion of the event-processing query from the memory.

10. The method of claim 7 further comprises inserting a mechanism to defer loading of the at least the portion of the event-processing query into memory until triggered.

11. The method of claim 7 further comprises inserting a mechanism to collect data related to execution of the event-processing query.

12. The method of claim 11 further comprises employing machine learning with respect to the data to infer at least one of a page-in trigger or page-out trigger.

13. The method of claim 7 further comprises inserting a mechanism to save state of the at least the portion of the event-processing query in connection with swapping the event-processing query out of the memory.

14. The method of claim 7 further comprises inserting a mechanism to recover state of the at least the portion of the event-processing query in connection with swapping the event-processing query into the memory.

15. The method of claim 7 further comprises inserting a mechanism to swap out of the memory a subset of the at least the portion of the event-processing query.

16. A computer-readable storage medium having instructions stored thereon that enable at least one processor to perform a method upon execution of the instructions, the method comprising:
detecting a page-in trigger of an event-processing query specified in a pageable form that enables swapping of at least a portion of the event-processing query into and out of memory, wherein the page-in trigger is based on at least one characteristic of one or more of the event-processing query or an event sequence over which the event-processing query operates; and loading at least a portion of an event-processing query located outside of memory into the memory in response to detecting the page-in trigger.

17. The computer-readable storage medium of claim 16, the method of loading the event-processing query comprises:

locating a data representation of the at least the portion of the event-processing query based on an identifier; and compiling the data representation to executable code.

18. The computer-readable storage medium of claim 16, the method further comprises:

detecting a page-out trigger with respect to the event sequence; and unloading the at least the portion of the event-processing query from memory in response to detecting the page-out trigger.

19. The computer-readable storage medium of claim 18, the method of unloading the event-processing query comprises initiating a state capture operation that captures current state of the event-processing query.

20. The computer-readable storage medium of claim 18, the method of unloading the event-processing query comprises unloading solely a subset of the at least the portion of the event-processing query.

\* \* \* \* \*